United States Patent [19]
Weber et al.

[11] 4,160,411
[45] Jul. 10, 1979

[54] SOUND SIGNAL BODY FOR GENERATING UNDERWATER SOUND SIGNALS

[75] Inventors: Adolf Weber, Neunkirchen; Erhard Münster, Winkelhaid; Dieter Buckley, Nüremberg, all of Fed. Rep. of Germany

[73] Assignee: Diehl, Nüremberg, Fed. Rep. of Germany

[21] Appl. No.: 841,459

[22] Filed: Oct. 12, 1977

[30] Foreign Application Priority Data
Oct. 12, 1976 [DE] Fed. Rep. of Germany ...... 2645914

[51] Int. Cl.² .................... F42B 22/20; F42B 27/00
[52] U.S. Cl. .................................. 102/7; 102/64; 102/230
[58] Field of Search ................ 102/7, 16, 64, 230, 102/274, 261

[56] References Cited
U.S. PATENT DOCUMENTS

| | | | |
|---|---|---|---|
| 1,514,743 | 11/1924 | Taylor | 102/7 |
| 1,683,692 | 9/1928 | Ogden | 102/7 |
| 2,966,849 | 1/1961 | Joiner | 102/230 X |
| 3,015,270 | 1/1962 | Domingos et al. | 102/7 |
| 3,285,170 | 11/1966 | Fietelaars | 102/16 X |
| 3,532,057 | 10/1970 | Aubrey | 102/7 X |
| 3,683,814 | 8/1972 | Bedall et al. | 102/64 |

FOREIGN PATENT DOCUMENTS
2308905 2/1976 France ........................ 102/7

Primary Examiner—David H. Brown
Attorney, Agent, or Firm—Becker & Becker, Inc.

[57] ABSTRACT

A sound signal body, for generating underwater sound signals, that includes an explosive body which can be thrown out or released by hand. Within the explosive body is arranged an explosive charge as well as a hand grenade detonator having a pyrotechnical delayed detonator composition. The detonator is explodable at the head of the explosive body by a hammer. The sound signal body is provided with a hydraulic pressure switch which comprises a pressure chamber, at least one inlet which empties into the pressure chamber, and a membrane or diaphragm. The diaphragm is connected with a release bolt, which, through the diaphragm and dependent upon the pressure of the water flowing into the pressure chamber, is movable out of a safety position into an armed position. The sound signal body is further provided with a locking mechanism, by means of which it is possible, on the one hand, to arrest the hammer which, against the force of a torsion spring, is deflected in a safety position, as well as, on the other hand, to release the hammer, after obtaining a specific water pressure within the pressure chamber, in cooperation with the release bolt, by relaxing the torsion spring.

9 Claims, 5 Drawing Figures

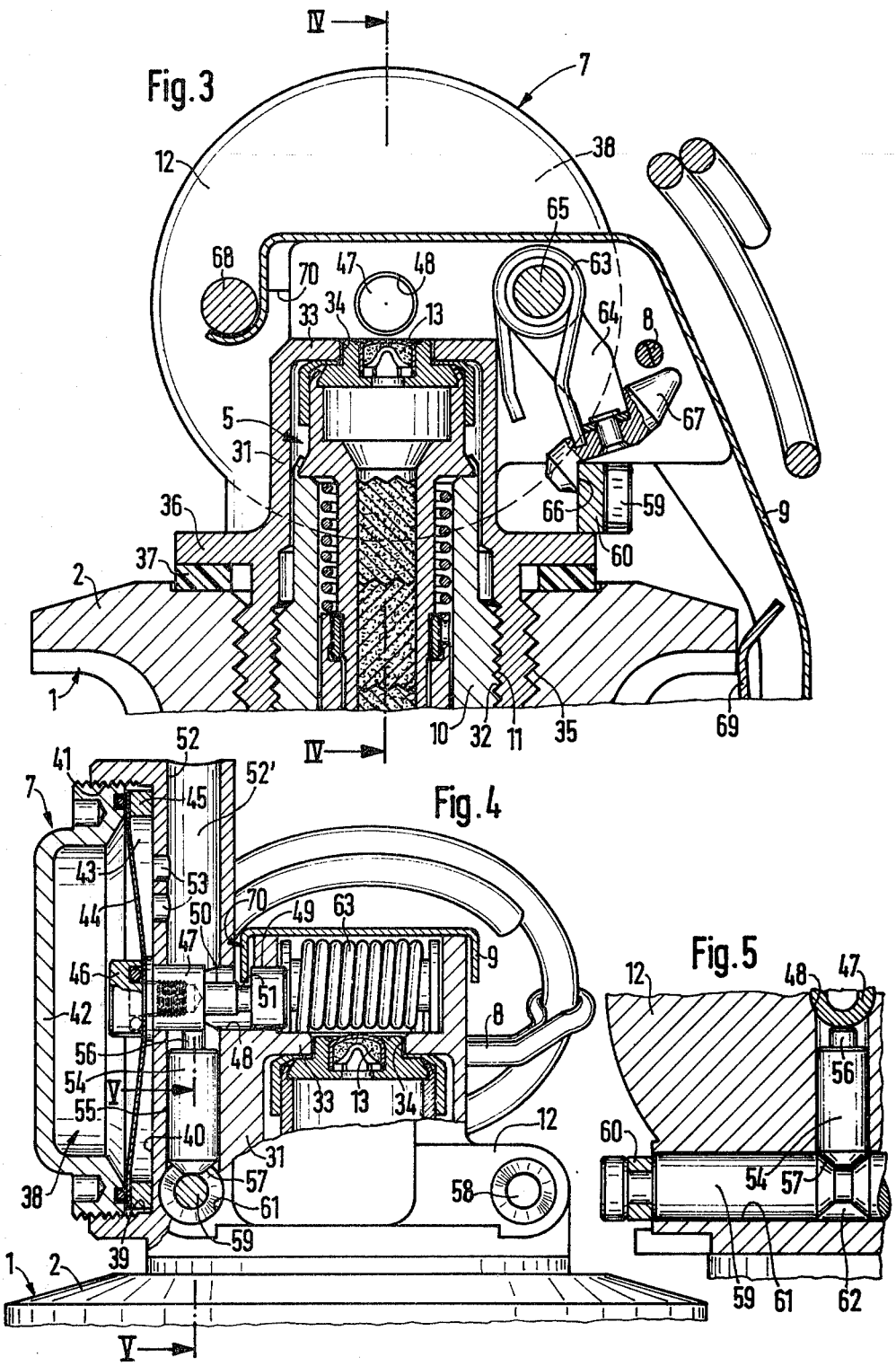

SOUND SIGNAL BODY FOR GENERATING UNDERWATER SOUND SIGNALS

The present invention relates to a sound signal body for generating underwater sound signals. The sound signal body comprises an explosive body which can be thrown out or released by hand. In the interior of the explosive body is arranged an explosive charge as well as a hand grenade detonator having a pyrotechnical delayed detonator composition. The hand grenade detonator is explodable at the head of the body by means of a hammer.

The main elements of the sound signal body correspond, for the most part, to the construction of a hand grenade. Such a hand grenade, as well as a hand grenade detonator used in the sound signal body to detonate the explosive charge, is described in German Offenlegungsschrift No. 20 10 880.

It is also known from German Offenlegungsschrift No. 22 15 876, with sea mines, torpedoes, or the like, to provide a hydraulic pressure switch as a safety device for the detonation mechanism to prevent a premature detonation. Only after exceeding a fixed pressure limit does the hydraulic pressure switch release the safety mechanism of the detonator.

It is an object of the present invention, especially for training purposes, to develop a device which makes communication possible between surface vessels and submarines by producing underwater sound signals and, in addition, has safety elements which guarantee adequate protection of the operator as well as nearby troops and equipment, the protection also being guaranteed over, as well as up to, a specific depth below water.

This object and other objects and advantages of the present invention will appear more clearly from the following specification in connection with the accompanying drawings, in which:

FIG. 3 is an enlarged longitudinal section of that portion of FIG. 1 within the dot-dashed circle III;

FIG. 4 is a longitudinal section taken along the line IV—IV of FIG. 3; and

FIG. 5 is a longitudinal section through the locking mechanism of FIG. 4 taken along the section line V—V.

Figure 1:
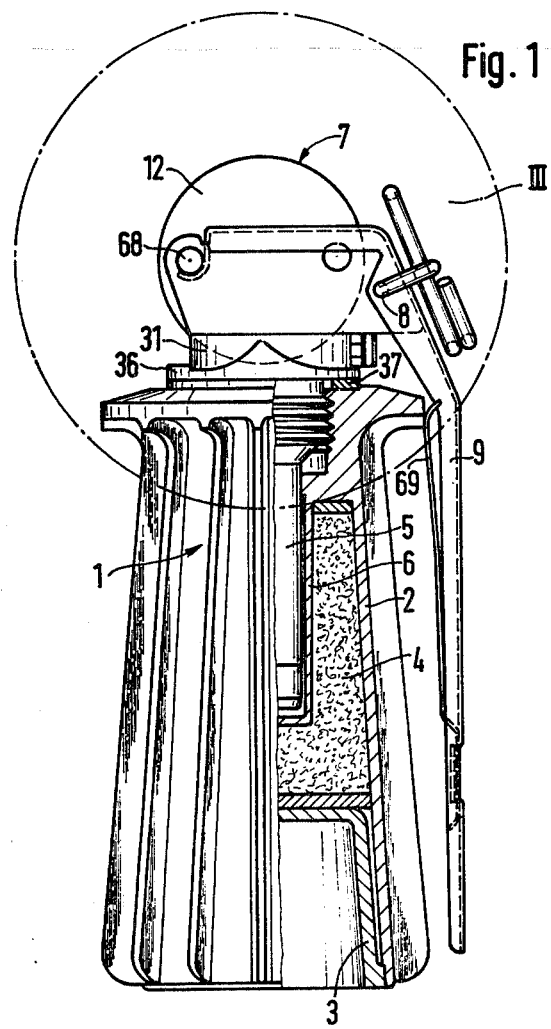
FIG. 1 is a side view of a sound signal body pursuant to the present invention and is partially sectioned.

The present invention is characterized by a sound signal body of the above mentioned general type which is provided with a hydraulic pressure switch which, in a manner known per se, comprises a pressure chamber, at least one inlet which empties into the pressure chamber, and a membrane or diaphragm. The diaphragm is connected with a release bolt which, through the diaphragm and dependent upon the pressure of the water flowing into the pressure chamber, is movable out of a safety position into a disengaged or armed position. The sound signal body is further provided with a locking mechanism, by means of which, on the one hand, it is possible to achieve a stopping of the hammer which, against the force of an energy storing element, is deflected in a safety position, as well as, on the other hand, to achieve the release of the hammer, after obtaining a specific water pressure within the pressure chamber, in cooperation with the release bolt by relaxation of the energy storing element.

Pursuant to an advantageous embodiment of the present invention, the locking mechanism comprises a blocking bolt and a locking slide, both of which are axially displaceable in the housing of the hydraulic pressure switch. The hammer, which is deflected in the safety position, contacts the locking slide. In addition, the blocking bolt is designed as a mechanical coupling element and is arranged between the release bolt and the locking slide. The blocking bolt furthermore, under action of force, is axially displaceable by the locking slide out of a locked position into an unlocked or disengaged position. The blocking bolt, according to the position of the release bolt, stoppingly engages either the release bolt or the locking slide.

The sound signal body according to the present invention is handled similarly to a hand grenade, since it is purely externally distinguished from the latter only by the hydraulic pressure switch arranged at the head, but otherwise has the same construction, including the outer safety elements, such as a safety lever and a safety pin.

By means of the hydraulic pressure switch, which is joined with the explosive body, especially, however, by means of the locking mechanism which is coupled with the hydraulic pressure switch and the hammer, an additional safety device is available by means of which the detonator mechanism of the explosive body is releasable only at a water pressure which corresponds to a minimum predetermined depth. With the locking mechanism of the present invention, by means of which the hammer is held in a safety position, incorrect handling by operators, for instance undesired or accidental pulling of the safety pin, as well as a removal of the safety lever, have no effect upon the safety mechanism. The safety pin as well as the safety lever, with this arrangement, will be only a security during transport.

Referring now to the drawings in detail, the sound signal body comprises an explosive body 1, the housing 2 of which is closed off at the bottom by a cup-shaped base piece 3. An explosive charge 4 as well as a hand grenade detonator 5 are inserted in the housing 2 of the explosive body 1. The hand grenade detonator 5 is shielded from the explosive charge 4 by a cup-shaped housing section 6. On the head of the explosive body 1 is further arranged a hydraulic pressure switch 7 which is screwed into the housing 2, as well as, outside on the housing 2, a safety arm or lever 9 which is held by a safety pin 8 which is detachable by hand.

Figure 2:
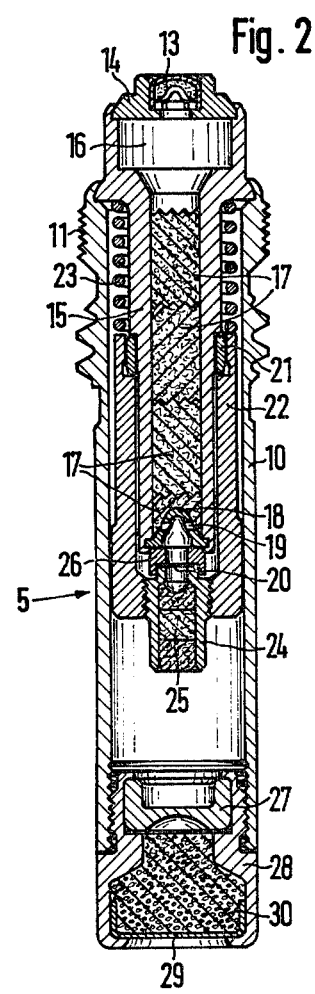
FIG. 2 is a longitudinal section through a hand grenade detonator arranged in the sound signal body to detonate same.

As shown in detail in FIG. 2, the hand grenade detonator 5 comprises a tubular detonator housing 10 which has an external thread 11 with which the detonator 5 is fastened in the housing 12 of the hydraulic pressure switch 7. A detonator cap 13 is concentrically held on the head of the detonator 5 by a detonator cap holder 14 which is arranged at the upper end of a delay composition holder 15 and is separated from a pyrotechnical delay composition 17 by a gap 16. A throttle or restrictor cap 18 having radial bores 19, as well as a flap valve 20, is connected to the delay composition 17 at the bottom thereof. A ring of solder 21 which serves as a safety element connects the stationary delay composition holder 15 with a tubular detonator holder 22 which is slipped approximately half way over the delay composition holder 15. One end of a preloaded spiral spring 23 rests against the forward end face of the detonator holder 22, while the other end of the spring 23 rests against the delay composition holder 15. A detonator cap 24, which has a detonator charge 25 and a thermal insulating disc 26, is screwed into the bottom of the detonator holder 22. The detonator holder 22 is axially displaceable within the detonator housing 10. Finally, at the bottom of the detonator housing 10, yet another holder body 28 is screwed in. The holder body 28 is provided with a cup-shaped insert bottom 27 in which is inserted a reinforcing charge 30 which is separated from the explosive charge 4 by a cover plate 29.

As shown particularly in FIG. 3, the housing 12 of the hydraulic pressure switch 7 comprises a partially hollow mounting base 31 into the interior of which the hand grenade detonator 5 partially axially projects, where it engages an inner thread 32 with its external thread 11. The end face of the mounting base 31 is defined by a flat front plate 33, in the plane of which lies the detonator cap 13, which, along with the detonator cap holder 14, extends through a bore 34 of the front plate 33. The hydraulic pressure switch 7, together with the hand grenade detonator 5, is screwed into the housing 2 of the explosive body 1 up to an abutment flange 36 by means of an outer thread 35 which is formed on the bottom end of the mounting base 31. The abutment flange 36 is similarly formed on the outside of the mounting base 31. In addition, a gasket or sealing ring 37 is inserted between the housing 2 and the abutment flange 36.

A pressure cap 38 having a round cross section is eccentrically formed on the mounting base 31 as a further element of the housing 12 of the hydraulic pressure switch 7. The axis of the pressure cap 38, as well as the detonator axis, intersect on the mounting base 31 perpendicular to one another and above the front plate 33. The pressure cap 38 has a circular molded-in section 39 with a flat bottom 40 and an inner thread 41 into which is screwed a cup-shaped closure cap 42 which is curved toward the outside. In the thus created hollow space is provided a pressure chamber 43 which is axially defined by the bottom 40 and a membrane or diaphragm 44, the inside of which rests against the closure cap 42, and is radially defined by a sealing ring washer 45. The diaphragm 44 is preloaded so as to be funnel-shaped in the direction toward the bottom 40. A release bolt 47 is concentrically mounted on the diaphragm 44 by means of a screw 46. The release bolt 47 is axially movably mounted in a bore 48 which extends coaxial to the pressure cap 38. The release bolt 47 has a cylindrical guide shaft 49 as well as a first radial groove 50 and a second axially displaced radial groove 51. A further bore 52 is additionally formed in the pressure cap 38. The bore 52 is laterally displaced from, yet extends parallel to, the detonator axis and intersects the bore 48. The upper portion of this bore 52 forms an inlet 52' from which two inlets 53 laterally empty into the pressure chamber 43. By means of these bores, the water can enter the pressure chamber 43 from the outside, causing a pressure, which is dependent upon the depth of the water, to build up, and by means of which finally the diaphragm 44, and therewith the release bolt 47, can be axially deflected out of the illustrated safety position into an armed position.

The lower portion of the bore 52 serves as a guide for a blocking bolt 54 which is axially displaceably mounted therein. The blocking bolt 54 is a portion of a locking mechanism which additionally has a locking slide. The blocking port 54 comprises a cylindrical guide shaft 55, at the bottom of which is formed a cone 57, and at the top of which is formed extension 56 with a smaller diameter. With this extension 56, the blocking bolt 54 is able to engage the first radial groove 50 on the release bolt 47.

The locking slide comprises two bolts, namely a guide bolt 58 and a safety bolt 59, both of which are coupled to one another by a crossbar 60 and are axially displaceably guided in bores in the housing 12 of the hydraulic pressure switch 7. These bores have parallel axes and are arranged transverse to the detonator axis. The bore 61, which receives the safety bolt 59, is arranged perpendicular to the bore 52, while the axis of the bore 52 passes through the axis of the bore 61.

A wedge-shaped radial groove 62 is formed on the safety bolt 59 of the locking slide. The side surfaces of the radial groove 62 are inclined toward one another at an obtuse angle of greater than 100°. The blocking bolt 54, with its cone 57 which conforms to the cross sectional shape of the radial groove 62, extends into the latter. The wedge-shaped, inclined surfaces thereby form an inclined planar surface for axial displacement of the blocking bolt 54.

As shown particularly in FIG. 3, a hammer 64, which is deflected in the safety position against the force of a torsion spring 63, is held by the crossbar 60 of the locking slide. The hammer 64 is pivotally mounted on the outside of the housing 12 of the hydraulic pressure switch 7 on a bearing bolt 65 together with the torsion spring 63 and, with an indentation 66 on the striker or firing pin 67, rests against the middle of the crossbar 60.

Finally, on the outside of the housing 12 of the hydraulic pressure switch 7, is arranged yet another bolt 68, by means of which the safety lever 9, with one end being free, is mounted. The safety lever 9 is subjected to the pressure of a flat spring 69, which is fastened on the safety lever 9 as well as being supported on the housing 2 of the explosive body 1. The safety lever 9 is held in the safety position by the manually removable safety pin 8. In addition, to increase the assurance of detonation, an additional security during transport is provided, according to which the safety lever 9 extends into the second radial groove 51 on the release bolt 47 with a reinforcing member 70 which is formed on the safety lever 9. A further security against unauthorized handling of the detonator and safety mechanisms is provided by the inlets 53 which extend at right angles away from the inlet 52' to the pressure chamber 43. It is thus impossible to displace the diaphragm 44 and the release bolt 47 out of its safety position by external handling.

The sound signal body functions as follows: after removing the safety pin 8, the sound signal body is thrown overboard. The flat spring 69 arranged on the safety lever 9 takes care of removing or releasing the safety lever 9 after the sound signal body has been thrown. This release removes the security during transport of the release bolt 47. After immersion of the sound signal body into the water, water enters the pressure chamber 43 of the hydraulic pressure switch 7 through the inlet 52' as well as the two inlets 53. The hydraulic pressure switch begins to function when it is about 10 to 13 meters deep in water. As a result of the water pressure which builds up in the pressure chamber 43, the diaphragm 44, along with the release bolt 47, is axially moved out of the safety shown in FIG. 4 into an armed position, as a result of which the blocking of the locking mechanism is discontinued. The blocking bolt 54, with its extension 56, can then engage the radial groove 50 in the release bolt 47. The now no longer blocked hammer 64, under the pressure of the preloaded torsion spring 63, now turns suddenly in the direction of the detonator cap 13 in the hand grenade detonator 5. With this turning movement, the firing pin or striker 67 of the hammer 64, which rests against the crossbar 60, takes the locking slide along with it, as a result of which not only the guide bolt 58 but also the safety bolt 59 are pulled axially out of the housing 12 of the hydraulic pressure switch 7. By means of the axial displacement of the safety bolt 59, the blocking bolt 54 is simultaneously axially displaced in the direction of the release bolt 47, into the groove 50 of which the extension 56 of the blocking bolt 54 projects. As soon as the hammer can no longer be held by the axially disengaged locking slide, it strikes the detonator cap 13, the fire flash of which ignites the pyrotechnical delay composition 17 in the holder 15. After about four seconds, the heat which results from the burning of the delay composition is sufficient to melt the ring of solder 21, thereby removing the connection between the delay composition holder 15 and the detonator holder 22. The spiral pressure spring 23 then moves the detonator holder 22 with the detonator cap 24 toward the holder body 28 in which is inserted the reinforcing charge 30. After the pyrotechnical delay composition 17 has burned out, about 7 seconds, the fire flash, through the two bores 19 of the throttle or restrictor cap 18, strikes the flap valve 20, as a result of which the flap valve is deflected and the detonator charge 25 is ignited. The charge 25 in turn explodes the reinforcing charge 30. As a result, the explosive charge 4 of the sound signal body, which by now has sunk in the water to a depth of about 15 meters, is detonated. As a result of this detonation, sound waves are generated which can be received by submarines as a signal.

To deliver specific messages or commands, a plurality of sound signal bodies are detonated in a specific number as well as at specific intervals corresponding to a previously determined code.

It is, of course, to be understood that the present invention is by no means limited to the specific showing of the drawings, but also encompasses any modifications within the scope of the appended claims.

What we claim is:

1. A sound signal body, for generating underwater sound signals, which comprises:
    an explosive body;
    an explosive charge arranged within said explosive body;
    detonator means arranged within said explosive body;
    a pyrotechnical delay composition associated with said detonator means;
    a hammer associated with said sound signal body and movable from a first position representing a safety position to a second position representing a striking position for igniting said composition;
    spring means associated with said sound signal body and said hammer for constantly urging said hammer into said striking position;
    a locking mechanism associated with said hammer and operable to arrest said hammer in the safety position and to release said hammer so that said spring means moves said hammer into said striking position;
    a hydraulic pressure switch associated with said sound signal body and including a diaphragm, said pressure switch being operable in response to a specific fluid pressure to permit said locking mechanism to release said hammer,
    said hydraulic pressure switch including a pressure chamber, inlet means for connecting said pressure chamber to the environment, and a relelase bolt connected to said diaphragm and movable thereby into different control positions to control said locking mechanism, said diaphragm being locatetd in said pressure chamber, said locking mechaniam comprising a blocking bolt and a locking slide, said locking slide being operable to arrest said hammer in the safety position, said blocking bolt being arranged between said release bolt and said locking slide and being axially displaceable by the latter out of a locked position into an unlocked position in accordance with the control position of said release bolt.

2. A sound signal body according to claim 1, in which said locking slide comprises a guide bolt and a safety bolt, both of which are parallel to one another and are coupled to one another by a crossbar which is operable to arrest said hammer in its safety position, said guide bolt and safety bolt extending transverse to the axis of said detonator means.

3. A sound signal body according to claim 2, in which a bearing bolt is mounted on said pressure switch, said hammer being pivotally mounted on said bearing bolt, said hammer being provided with a striker which has an indentation engageable by said crossbar for arresting said hammer in the safety position.

4. A sound signal body according to claim 2, in which said safety bolt has a wedge-shaped radial groove, the two side surfaces of which are inclined toward one another at an obtuse angle of greater than 100°.

5. A sound signal body according to claim 2, in which said hydraulic pressure switch is provided with a bore for guiding said blocking bolt, said blocking bolt being arranged at right angles to both said safety bolt and said release bolt.

6. A sound signal body according to claim 5, in which said inlet means comprises a portion of said bore in said pressure switch and two further inlet bores of smaller diameter located in said pressure switch and laterally leading from said bore into said pressure chamber.

7. A sound signal body according to claim 5, in which that end of said blocking bolt which faces said safety bolt is provided with a cone which conforms to the cross sectional shape of said wedge-shaped radial groove, said cone being operable to engage said radial groove for arresting said hammer in the safety position, and also being operable in accordance with the control position of said release bolt, to be moved out of said radial groove into an unlocked position, permitting said spring means to swing said hammer into said striking position.

8. A sound signal body according to claim 5, in which said release bolt is provided with a first radial groove, and said blocking bolt is provided at that end thereof which faces said release bolt with an extension operable to engage said first radial groove.

9. A sound signal body according to claim 8, in which said release bolt has a second radial groove, and in which said sound signal body is provided with a safety lever, a safety pin for securing said safety lever, and a reinforcing member formed in said safety lever for engaging said second radial groove for increasing the security of the safety position of said hammer.

* * * * *